United States Patent [19]

Leva

[11] 4,316,863
[45] Feb. 23, 1982

[54] TOWER PACKING ELEMENTS

[76] Inventor: Max Leva, 5600 Munhall Rd., Pittsburgh, Pa. 15217

[21] Appl. No.: 205,661

[22] Filed: Nov. 10, 1980

[51] Int. Cl.³ ............................................. B01F 3/04
[52] U.S. Cl. ..................................... 261/98; 55/90; 202/158; 261/DIG. 72
[58] Field of Search ........................... 261/94–98, 261/112, 79 A, DIG. 72; 210/150, 151; 55/90; 202/158

[56] References Cited

U.S. PATENT DOCUMENTS

| | | | |
|---|---|---|---|
| 2,602,651 | 7/1952 | Cannon | 261/95 |
| 2,639,909 | 5/1953 | Leva | 261/DIG. 72 |
| 3,266,787 | 8/1966 | Eckert | 261/DIG. 72 |
| 3,311,356 | 3/1967 | Eckert | 261/DIG. 72 |
| 3,957,931 | 5/1976 | Ellis et al. | 261/98 |
| 4,086,307 | 4/1978 | Glaspie | 261/DIG. 72 |
| 4,203,934 | 5/1980 | Leva | 261/98 |

FOREIGN PATENT DOCUMENTS 1029346  12/1955  Fed. Rep. of Germany ........ 261/94

*Primary Examiner*—Richard L. Chiesa
*Attorney, Agent, or Firm*—William J. Ruano

[57] ABSTRACT

A randomly packed bed in a tower or column to prevent nesting of the packing elements and to improve physical stability and efficiency. Each packing element is a curved strip with reinforcing ribs and with one or more integral tabs or tongues depending downwardly from slots spaced longitudinally of the strips. Multiple rows with slots may be provided along the strip. The strips are perforated throughout their entire area to provide improved drainage and improved interlocking and improved internal liquid distribution in the packed bed. Point-to-point contact between packing elements, substantially non-varying resistance to fluids flowing and improved mass transfer performance resulting from a more uniform packing density are assured.

15 Claims, 6 Drawing Figures

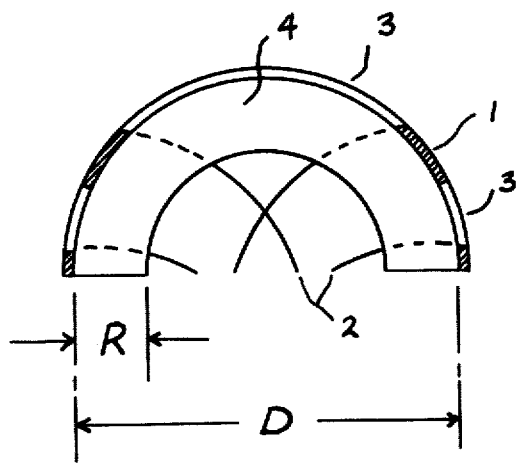
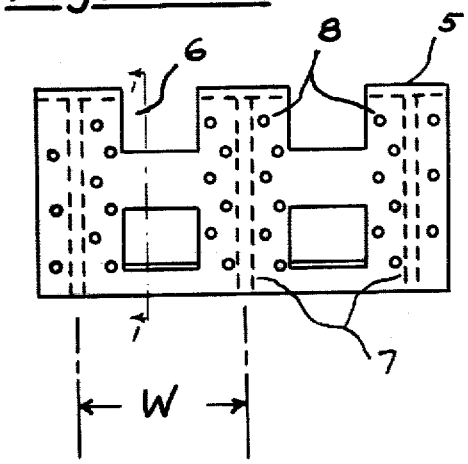
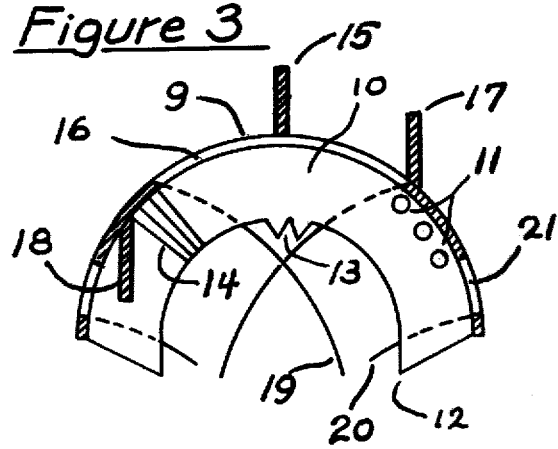
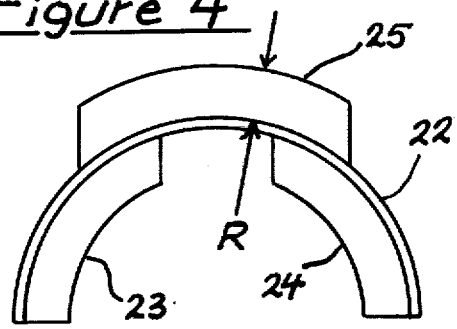
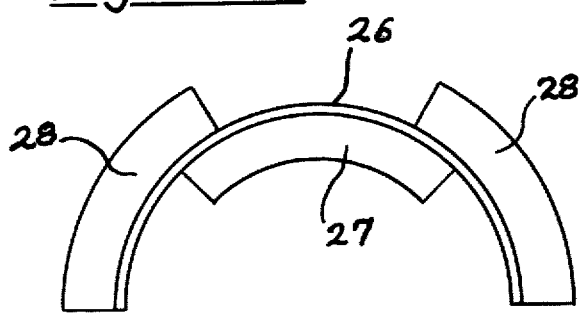
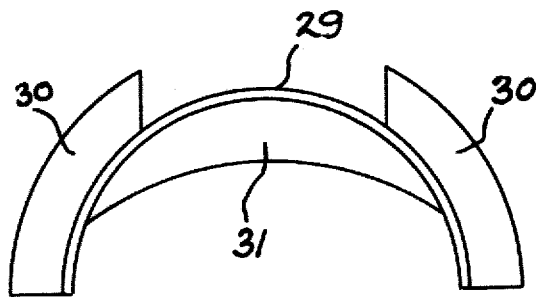

TOWER PACKING ELEMENTS

This invention relates to novel detatils pertaining to tower packing elements of the dumped type. As is well known, these packings are commonly used in distillation, gas absorption and related operations. Specifically, the dumped packings are usually charged into vertical towers in which they provide a skeleton along which it is endeavored to pass liquid downwardly, while through the interstices between the individual packing elements, gases or vapors are passed upwardly. Thus with the liquid stream finely divided over a major portion of the dumped packings, mass transfer will occur between the liquid and vapor phases.

In order to be effective to bring about such a mass transfer exchange between the flowing phases, a dumped packing must exhibit a large number of mechanical as well as physical properties. These properties are described in considerable detail in the technical as well as patent literature, and to enumerate even a modest number of the many publications and patents which are concerned with this would be laborious. However, in order to provide an introduction, see "Tower Packings and Packed Tower Design" written by me and published in 1953 by "The United States Stoneware Company", Akron, Ohio. As far as a patent is concerned that describes the required properties of dumped packings in an instructive manner, reference is made to my U.S. Pat. No. 4,203,934.

Without reciting all the required qualities which the ultimate packing should comprise, let it be emphasized that one of the most important properties which a dumped packing must have is mechanical strength. This is especially so with packings made of plastics when these are used at elevated temperatures. Since many plastic substances will tend to soften under elevated temperature use, plastic packings will frequently become deformed when used in a high temperature service, which will bring about a deterioration of the geometric shape with the result that the effective packing surface or gas-liquid contact surface will decrease.

Another important attribute which the ultimate packing should have is to provide a maximum available surface area along which the liquid can descend, divide into thin rivulets to create liquid films, and in this highly subdivided state contact the ascending gases or vapors.

A third very important attribute of the ultimate dumped tower packing is that the resulting packed bed should impart a high state of turbulence on the ascending gas or vapor and thereby bring about enhanced mass transfer performance.

With these three important aspects and requirements of the ultimate dumped tower packing it has been found entirely unexpectedly and surprisingly that in tower packings of the open curved strip type with curvature essentially in a single direction such as are described in my U.S. Pat. No. 4,203,934 dated May 20, 1980, all three key qualities in dumped tower packings may be achieved by a proper choice and arrangement of baffles and ribs in the parent piece. Whereas the provision of baffles and ribs may be used with whole ring-type packings or other shapes, it was found particularly useful and advantageous to have the novel baffling associated with the open ended strip structures which are described in my U.S. Pat. No. 4,203,934.

Having thus described the essence of my invention, the accompanying drawings will serve the purpose of further exemplification and description without limiting the scope of the invention or the claims thereto, wherein:

FIG. 1 is a sectional, front elevational view taken along line 1—1 of FIG. 2 of a packing element embodying the invention;

FIG. 2 is a side elevation of the packing element shown in FIG. 1;

FIG. 3 is a sectional, front elevation of a modification showing a packing element embodying various special features of the invention;

FIG. 4 is a front elevation of another embodiment of the invention;

FIG. 5 still another modification of the invention, and

FIG. 6 represents still another form of the invention.

Referring now to FIG. 1, the arcuate wall of the packing element is denoted by numeral 1. Numeral 2 denotes tongues depending inwardly from the ends of slots 3, contained in the open ended curved strip. As will be seen, the open ended strip is essentially semi-circular and extends through an angle of about 180 degrees. It is, of course, understood that the open ended strip could comprise any other open ended shape, such as a hyperbola, parabola or combination thereof, and extend through an angle of from 90° to more or less 180°, within the spirit of the invention.

It will be seen that numeral 4 denotes a baffle depending downwardly from the open ended curved strip surface, pointing toward the center of the curved strip. It will be noted that the depth of the baffle is uniform over its entire course and is denoted by letter "R". On the other hand, the largest expanse of the baffle is denoted by letter "D". It has been found that in order for the baffles or ribs to be effective to bring about an important additional measure of mechanical strength, as well as add materially to the contact area of the packing element and thirdly provide additional turbulence to the flowing liquid and gas or vapor stream, it was found desirable that the ratio of the quantities D/R should not be greater than six. On the other hand, it has also been found that the ratio of D/R should not be smaller than 2.5, without having adverse effects. Thus for most favorable results, it was found that D/R should vary between 5.5 and 3.0.

A side elevation of FIG. 1 is shown in FIG. 2. The packing wall of the element is denoted by numeral 5. The slots in the element are indicated by numeral 6. A total of three ribs are shown, identified by numeral 7. The distance between the ribs or baffles is indicated by letter "W". Just as there is a critical relationship between quantities "R" and "D", as outlined in connection with FIG. 1, a critical relationship does also exist between "W" and "D" for which results are best. Thus it is noted that the ratio of D/W should not be greater than three, nor less than one. However, for most favorable results the ratio of D/W should be between 2.5 and 1.5.

FIG. 2 contains drainholes, indicated by numeral 8. Owing to the relative considerable width "R" of the baffles, there would be an appreciable accumulation of liquid hold-up during any typical operation that would interfere unfavorably with the operating efficiency of the packing. Moreover, this liquid hold-up would in many instances of inclination of the packing in relation to the horizontal position prevent the packing from draining completely. Thus, without drain holes, there would be unavoidable liquid contamination if the packing was used successively with different liquid systems.

Provision of the drain holes has shown to have additional favorable effects upon the mass transfer properties of a packed bed composed of elements of the invention. Since the packing element described in this invention is in most instances manufactured of plastics, and since packings made of plastics are largely used in gas absorption service in which large liquid rates are employed, it has been found that provision of holes 8 will assist with the subdivision of the irrigating liquid into small independent streams, with the result that the mass transfer is greatly enhanced.

Besides these effects, the provision of holes 8 will also tend to improve the mechanical stability of the packed bed by encouraging mutual interlocking of adjoining packing elements in the packed bed.

The size of holes 8 may vary from as small as about a millimeter in relatively small packing elements, to as large as about 10 millimeters in the largest pieces. For best results, however, the hole diameters will vary from two to eight millimeters. It must be of course understood that the holes 8 need not necessarily be circular. Thus they could be elliptical, oblong in a general sense, triangular, square, or have any other shape, without falling outside the scope of the invention.

FIG. 3 shows a typical sectional frontal elevation of a packing element, the surface of which is denoted by numeral 9. The baffle is identified by numeral 10, and it appears that drain holes 11 may also be provided in the baffles.

There are additional features which may be provided in the baffles. Thus the ends of the baffles may be pointed downwardly, as shown by numeral 12. This will encourage a more coordinated liquid run-off of liquid from one packing element to a neighboring packing element, by virtue of the additional point-to-point contact which is achieved between neighboring packing elements. Points 12 will also bring about additional interlocking and greater bed stability, by engaging drain holes 8, referred to in connection with FIG. 2.

The rims of the baffles may be serrated as shown by numeral 13, to encourage drop formation, or the baffles may carry grooves as shown by numeral 14, which would likewise assist with dropwise liquid run-off.

It will be noted that baffle 10 proceeds in a direction along the path of curvature of the packing element.

Whereas this is generally the most frequently practiced construction, it has also been observed that baffles which proceed transversely offer certain important advantages as far as performance is concerned.

Thus baffle or tongue 15 proceeds transversely, pointing away from the center of the packing element, and is seen to connect to the remainders of the walls that make up the windows or slots 16. By providing such a secondary baffle, much more mechanical strength is imparted to the element and additional points of contact are provided in the packed bed between adjoining packing elements. Finally, by placing a transverse baffle or tongue into such a position, a natural path for liquid flow inside the bed is provided, resulting in improved mass transfer.

Besides having transverse baffles or tongues in the position as shown by 15, other transverse baffles or tongues may be provided. Thus baffle or tongue 17 is sidewise displaced and attached over its entire length to the surface area 16 of the packing element, pointing away from the center of the packing element. Similarly, baffle or tongue 18 is likewise in touch over its entire length with the surface area of the packing element, however baffle or tongue 18 is seen to point toward the inside of the packing element.

It will be noted that in FIG. 3, tongues 19 and 20 are shown to depend from slots 16 and 21. It will be noted that tongues 19 and 20 are longer than the slots from which they depend. It has been found important to have a large degree of freedom in respect to the choice of length of the tongues in relation to the slots from which they appear to depend. Thus generally with longer tongues a more uniform spacing of the elements in the bed was observed to result, which was noted to have a significant favorable effect upon the uniformity of penetration of the bed by the irrigating liquid. Thus, generally speaking, enhanced mass transfer was observed to occur with tongues that are longer than the slots from which the tongues depend.

In some instances, however, it has also been useful to provide tongues which are shorter than the slots from which they depend. This, not shown in any of the Figures, would occur in such instances where a packing element embodies a large number of tongues, and where, due to space dictations, only small tongues can be provided here or there. It must be understood that addition of tongues which are smaller than the slots from which they depend will in no way limit the present invention.

As far as manufacture of the pieces is concerned, they are usually molded when made of plastics. Thus the way is entirely open to provide tongues of any lengths, provided there is no steric hindrance in the packing element. Furthermore, it is noted that with this general method of manufacture, the material which does constitute the tongues was in no way contained in the slots. Hence, the material which is missing from the slots is not related in any way to the material that comprises the tongues. Hence, the slots and depending tongues are formed entirely independently from one another.

Considering the actual increase in surface area that will be obtained by providing a typical packing element of two inches diameter and two inches width with three baffles, each of 0.5 inch of depth, it is noted that the additional surface area contributed by three baffles amounts to about 33 percent of the total surface area of the piece, which is noted to be quite appreciable. Thus provision of the baffles as described in the invention will not only provide additional strength, but will add much surface area as well, and through their arrangement provide more fluid turbulence and thus better mass transfer.

Another arrangement of baffles is shown in FIG. 4. Again the surface area of the packing element is indicated by numeral 22. It will be noted that three separate baffles are shown. Thus numerals 23 and 24 denote the baffles which are pointing to the inside of the element, whereas number 25 refers to a baffle which is on the opposite, pointing away from the element. Since the baffles are now shorter, their depth "R" may be smaller in order for the limits of D/R to be observed.

The arrangement of baffles or partial baffles as shown in FIG. 4 may be implemented in a number of ways. Thus a typical packing element may comprise three separate baffle courses, such as is shown in FIG. 2, with the two baffles on each end consisting of baffles 23 and 24, whereas the central baffle being represented by 25. Another implementation in accord with FIG. 4 may be the reverse, such that the end baffles may be represented by numeral 25, with the central baffle split and in accord with numeral 23 and 24. Finally all three partial baffles 23, 24 and 25 may be in one plane or any combination thereof.

It will be noted that with the arrangements of baffles just outlined, one does not only accomplish the formation of a strong element, but by having shortened the baffles and reduced them to partial baffles, the number of partial baffles has been increased over what would be obtained with whole baffles. This provision of partial baffles leads to a packing element that will provide more ready contact points with adjoining packing elements. Hence, by subdividing the baffles, the internal liquid distribution in the bed will be further improved over that obtained by provision of whole ribs, and additional contacting efficiency will result. Of course, although not specifically shown in a view of the surface area of the packing element, the surface area shall have to be provided with small perforations, as is already indicated in FIG. 2 to allow ready drainage of the irrigating liquid away from otherwise stagnant pockets.

Another implementation of ribs is shown in FIG. 5. Again, numeral 26 denotes the surface area of the packing element which is provided with slots and tongues as is shown in FIGS. 1, 2 and 3.

It will be noted that the implementation and arrangement of ribs in FIG. 5 is similar to that already shown in FIG. 4, except that in FIG. 5, the single partial rib 27 is on the inside of the element and the partial ribs 28 are on the outside. Generally speaking, the advantages to be derived from the construction of FIG. 5 are in principle equivalent to those offered by the construction of FIG. 4.

Essentially the same implementation as in FIG. 5 is also shown in FIG. 6. The wall of the packing element is represented by numeral 29, and two partial baffles 30 are shown on the outside. The baffle extending into the interior of the element denoted by numeral 31 is of a somewhat different shape. With a construction as shown in FIG. 6, one would, in general, expect similar results as with the construction as shown in FIG. 5. However, owing to the varying depth of baffle 31, additional dumped bed irregularity would result over that obtained with the element of FIG. 5 and added liquid and gas turbulence will result, leading to additional performance improvement.

Although not shown in a separate view of FIG. 4 to FIG. 6, the surface areas of the packing elements are intended to be with slots and tongues as is indicated in FIGS. 1 and 3. Furthermore, in all instances, perforations through the surface areas to facilitate better liquid drainage, better internal liquid distribution and added bed stability as shown in FIG. 2, are provided, although these perforations are not shown in FIGS. 3 to 6.

Whereas there is no basic limitation as to the material of construction making up the packing indicated in FIGS. 1 to 6, and the implementation of ribs, it is suggested that use of plastic substances and the various methods of forming plastic bodies will be most suitable for implementing the shapes presented in FIGS. 1 to 6.

By having provided ribs or baffles of certain depths and arrangements in combination with generally open ended curved strips, constructions have resulted that exhibit not only maximum mechanical strength, but which have also been found to contribute materially to improved mass transfer between liquids and gases or vapors, when used as contacting media.

While I have illustrated and described several embodiments of my invention, it will be understood that these are by way of illustration only and that various changes and modifications may be contemplated in my invention and within the scope of the following claims.

I claim:

1. In a packing for a vapor or gas-liquid contact tower and the like, a plurality of randomly packed mutually interlocking packing elements providing a bed, each packing element comprising an open ended curved strip exhibiting curvature only in a single direction through an angle of 90° to about 180°, said strip having a plurality of reinforcing ribs extending radially inwardly thereof and having a plurality of slots therebetween, a plurality of tongues extending essentially only inwardly of the curvature of said strip from the ends of said slots of a length comparable to that of said slots, said strip having a plurality of perforations on its outer surface to permit drainage, development of rivulets and interlocking with adjacent packing elements to provide substantial physical stability and a homogeneous packing and to prevent nesting of said packing elements.

2. In a tower packing as recited in claim 1 wherein said packing elements are of high temperature resistant plastic material.

3. In a tower packing as recited in claim 1 wherein the maximum distance between the ends of said ribs is no greater than 6 times the depth of said ribs.

4. In a tower packing as recited in claim 1 wherein the maximum distance between the ends of said ribs is no more than 3 times the width of said ribs.

5. In a tower packing as recited in claim 1 wherein at least one integral rib extends radially outwardly of said strip.

6. In a tower packing element as recited in claim 5 wherein said radially inwardly extending rib progressively decreases in depth from center to ends.

7. In a tower packing as recited in claim 5 wherein said radially outwardly and radially inwardly extending ribs overlap along said curved strip.

8. In a tower packing element as recited in claim 1 wherein perforations are provided in said ribs.

9. In a tower packing as recited in claim 1 wherein the radially inward edge of said reinforcing rib is serrated.

10. In a tower packing as recited in claim 1, having a total of three ribs extending radially inwardly from said strip with said slots and tongues extending substantially radially inwardly between said ribs.

11. In a tower packing as recited in claim 10 wherein the ratio of the distance between the free ends of said strip to the distance between ribs is between 6 and 2.5 and wherein the ratio between said distance and depth of said ribs is between 3 and 1.

12. In a tower packing as recited in claim 11 wherein said packing elements are of plastic material and wherein said ribs are radially grooved.

13. In a tower packing as recited in claim 1 wherein at least one additional rib extends outwardly of the curvature of said strip at right angles to said reinforcing ribs.

14. In a tower packing as recited in claim 1 wherein said tongues are of greater length than their adjoining slots.

15. In a tower packing as recited in claim 14 together with additional tongues of smaller length extending inwardly of the curvature of said strip near the end of said slots.

* * * * *